July 1, 1969

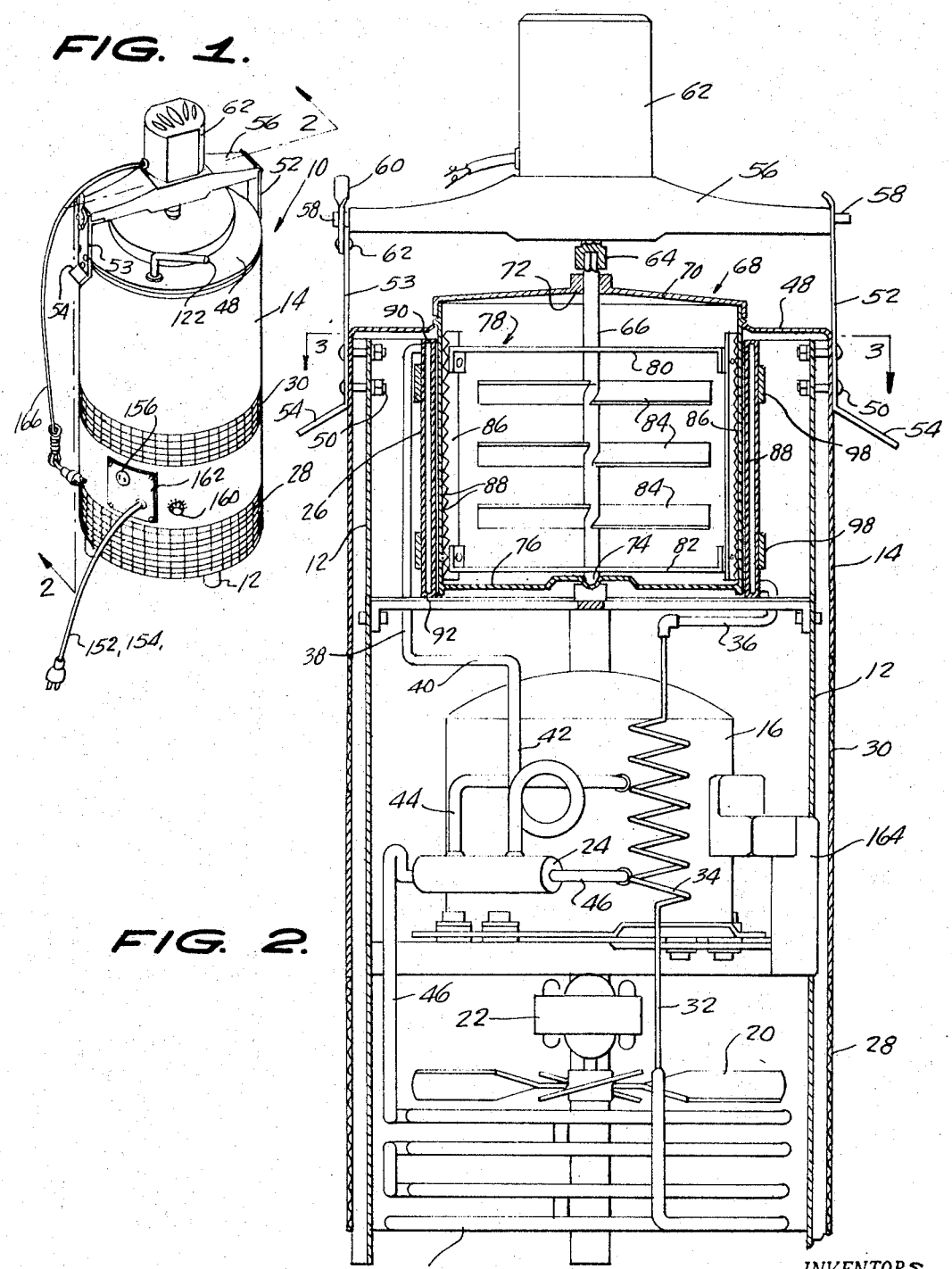

M. E. THURMAN ET AL 3,452,555

ICE CREAM FREEZER

Filed July 18, 1967

INVENTORS
GEORGE E. THURMAN,
MERRELL E. THURMAN,
BY

Berman, Davidson & Berman
ATTORNEYS.

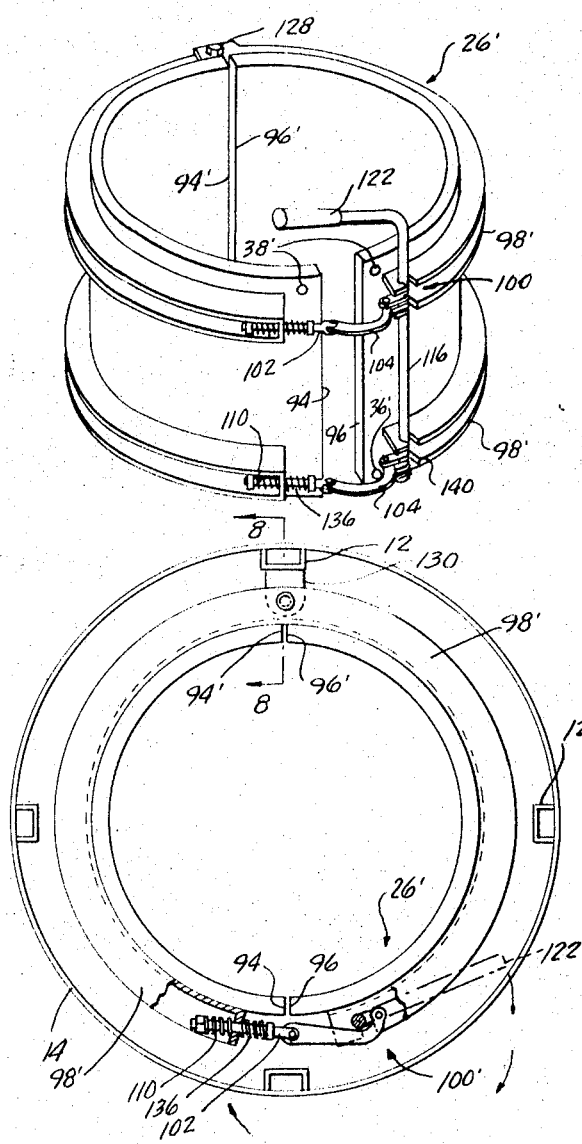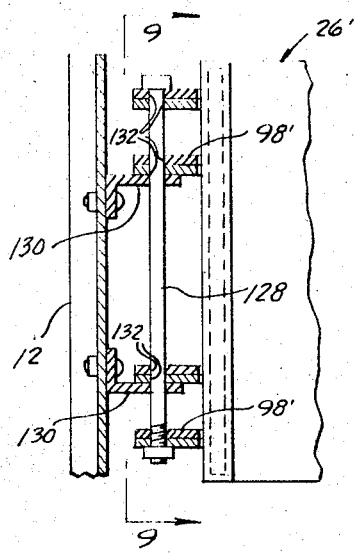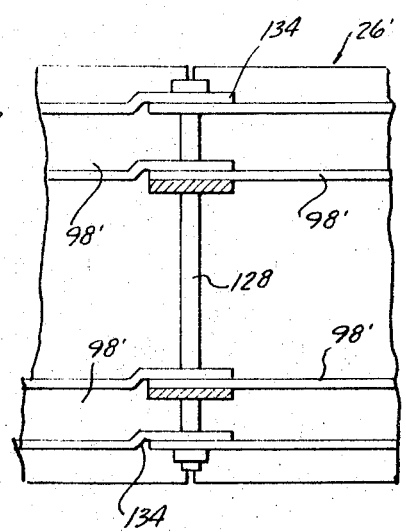

ered July 1, 1969

3,452,555
ICE CREAM FREEZER
Merrell E. Thurman and George E. Thurman, both of
Rte. 3, Box 9, Marble Falls, Tex. 78654
Filed July 18, 1967, Ser. No. 654,214
Int. Cl. F25c 7/00; F25b 47/00; A23g 5/00
U.S. Cl. 62—298                                 15 Claims

ABSTRACT OF THE DISCLOSURE

A portable freezer for ice creams, sherbets and ices, comprising a tubular, vertically elongated, shell housing refrigerant apparatus in the lower part including an evaporator in the upper part, said evaporator telescopically embracing in good heat-conducting relation a container for the mixture to be frozen, said container being separable upwardly from within the evaporator and being adapted to receive a rotatable dasher whose axle extends upwardly through a cover of the container. A motor mounted on a bar support is releasably coupled to the upper end of the dasher axle. For small volumes of mix to be frozen, the evaporator is provided as a solid receptacle body containing an evaporator coil. For intermediate sized volumes, the evaporator is preferably a longitudinally split, double-walled hollow receptacle for passage of the refrigerant fluid, the split edges being clampable together by a toggle clamp to tightly embrace the mix container. For large volumes, the evaporator is similarly a double-walled receptacle split along diametrically opposed lines into two portions which are hinged together and provided with a toggle clamp.

---

This invention relates generally to refrigerating apparatus, and more particularly to a portable freezer for ice creams, sherbets, ices, and like frozen or cooled dessert products.

The most common type of ice cream freezer marketed for home use is the very old product which utilizes a mixture of ice and salt surrounding a mix container and having manual or automatic means for stirring the mix during cooling. While this freezer performs satisfactorily the task of making ice cream, it is difficult and messy to use, and the required ice is no longer readily available. Various substitutes have been suggested, such as a portable container having an electric motor driven dasher to perform the mixing, and which is intended for placing in an electric refrigerator, or freezer, to perform the cooling. Since in such units cooling is accomplished mainly by convection currents rather than by conducting heat directly from the mix container to the refrigerator evaporator, these units are not efficient and require an unduly lengthy period to freeze the mix into ice cream. Furthermore, most refrigerators and freezers are of relatively nominal size and are usually fully stocked with other than the mix to be frozen, so that little space is available for an ice cream maker of any reasonable size. To set aside sufficient space in a freezer and hold the same available for an 8-quart ice cream maker would be unduly wasteful of space and electric energy to keep said space cool during the periods when the ice cream is not being made, or stored.

It is a primary object of the present invention to obviate the above briefly outlined disadvantages of conventional ice cream freezers.

It is another object of this invention to provide a portable ice cream freezer which is highly efficient in reducing the time necessary to freeze the product mix by including an evaporator which is in metal-to-metal contact with the container for the mix so as to rapidly conduct heat away from the mix container rather than only on slower radiation or convection of the heat.

Another important object of the invention is to provide a portable ice cream freezer, of the above-described characteristics, in which the mix container is slidably or otherwise removable from the evaporator in spite of the ice which may have formed thereon during the freezing.

Yet another object of the invention is to provide a portable ice cream freezer of the above described character, in which the evaporator, which telescopically receives the container for the mix to be frozen, is longitudinally split and a toggle clamp is provided for closing together the split edges of the evaporator to tightly embrace the mix container in good heat conduction manner.

Yet a further object of the invention is to provide an ice cream freezer, having the above-described characteristics, wherein the evaporator and mix container telescoped therein are seated in the upper part of a cylindrical shell whose lower part houses refrigerant apparatus including a compressor, a condenser, a fan, and a heat exchanger, all being suitably interconnected by conduits to conduct a liquid refrigerant to said evaporator and return the vaporized, or mixed vapor and liquid refrigerant to the compressor.

A still further object of the invention is to provide an improved ice cream freezer, having the above-described characteristics, in which the evaporator is split longitudinally and is provided with a toggle clamp to hold the split edges closely together and the evaporator in tight embracing contact with the mix container, said clamp releasing the split edges and spreading them apart upon actuation of a handle located above the shell having a pivot rod passing through the shell cover.

Yet a further object of the invention is to provide an ice cream freezer, of the above-described character, in which the mix container is readily separable from the embracing evaporator and is adapted to separably receive a motor driven dasher for mixing the liquid food product during freezing, said parts all being readily separable from one another to enable cleaning and complete sterilization of the mix container and the dasher.

A still further object of the invention is to provide an improved ice cream freezer, of the above-described character, which has a compact and simple structure; is inexpensive to construct, easy to assemble and use, and easy to disassemble and store when not in use.

The novel features that are considered characteristic of the invention are set forth with particularity in the appended claims. The invention, itself, however, both as to its organization and its method of operation, together with additional objects and advantages thereof, will best be understood from the following description of specific embodiments when read in connection with the accompanying drawings, wherein like reference characters indicate like parts throughout the several figures and in which:

FIGURE 1 is a perspective view of a portable ice cream freezer according to the invention in completely assembled condition;

FIGURE 2 is an enlarged, sectional view taken along line 2—2 of FIGURE 1, and looking in the direction of the arrows;

FIGURE 6 is a perspective view of a modified evaporator capable of substitution for that shown in FIGURES 3–5;

FIGURE 7 is a plan view of the evaporator of FIGURE 6, with the toggle clamp in closed position;

FIGURE 8 is a fragmentary sectional view taken from line 8–8 of FIGURE 7, and looking in the direction of the arrows;

FIGURE 9 is a sectional view taken from line 9–9 of FIGURE 8, and looking in the direction of the arrows;

Figure 3:
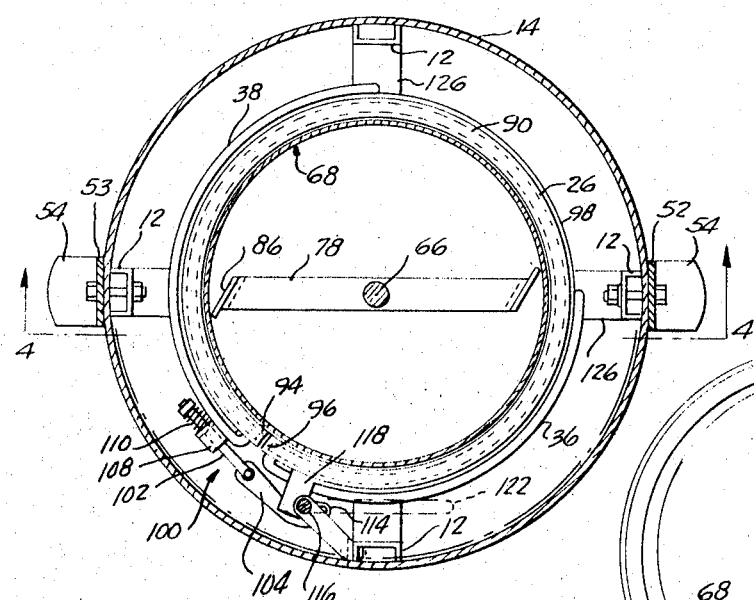
FIGURE 3 is a sectional plan view taken from line 3—3 of FIGURE 2, and looking in the direction of the arrows.

Referring now more particularly to the drawings, in FIGURES 1–5 there is shown a preferred embodiment of a portable ice cream freezer according to the invention, generally designated by numeral 10, and which comprises four, upstanding, vertical channel legs 12, placed at opposite ends of right angled diameters of a circle, and to which is secured, by bolts and/or welding, a tubular, or cylindrical shell 14. The lower portion of the shell houses a refrigerant apparatus including a compressor 16, a condenser 18, a fan 20 driven by electric motor 22, and a heat exchanger 24, all suitably interconnected with an evaporator 26 housed in the upper portion of the shell. Vertically spaced portions 28, 30 of the shell are perforated, or louvered, to permit the entrance of air circulated by the fan. The path for refrigerant liquid, which may be Freon 12 or any other suitable liquid refrigerant, may be traced from the condensor 18 through line 32, the restricted duct 34, to a manifold 36 leading to an inlet at the bottom of the evpaorator 26. The refrigerant roils or vaporizes in the evaporaor and passes through outlet duct 38 leading from the top of the evaporator to connecting lines 40, 42 leading to the heat exchanger 24, being driven by the pump mechanism of the compressor 16. The vaporized, or partially vaporized refrigerant passes from the heat exchanger through line 44 to the inlet of the compressor which is hermetically sealed and has a self-contained motor to perform the pumping. The compressor outlet is connected by line 46, which passes through the heat exchanger to the condenser inlet where the refrigerant vapor is condensed back to liquid by heat removal of air circulated by fan 20.

As described, it will be seen that the refrigerant apparatus includes standard components of conventional freezing apparatus utilizing a liquid refrigerant such as Freon, except for the arrangement of the elements in a vertical stack, the heat exchanger 24 using the hot liquid from the compressor outlet to prevent freezing at the compressor intake by circulating the hot liquid about the cold gas passing from the evaporator to the compressor inlet, and the structural features of the evaporator in relation to the container holding the mixture to be frozen, which will be explained hereinafter. The fan 20 serves to draw air into the shell 14 through the open bottom and through the openings, or louvers, in the bottom portion 28, thereby cooling and condensing the heated refrigerant in the condenser. Such air is blown upwardly and passes out of the shell through the upper apertured portion 30.

The upper end of the shell 14 is closed by an annular cover member 48 which may be integral with the shell. Bolts 50 secure two diametrically opposite handles 52, 53 to the shell 14. The handles are desirably straps having oblique hand-receiving portions 54, the upper ends of the straps being disposed to receive a motor support bar 56. To this end, strap 52 is provided at its upper end with an aperture, not shown, through which may be passed a protruding lug 58 at the end of the bar. A similar lug at the other end of the bar is removably supported in a notch at the upper end of the handle 53 by means of a latch 60, pivotally connected to handle 53 by pin 62. Mounted on the support bar 56 is an electric motor 62 having a vertically dependent drive shaft which passes through an aperture in the support and terminates in a coupling 64 having a square recess for receiving a similar shaped end of a dasher axle 66.

The mix container, designated 68, passes through the central opening of the shell cover 48, and is telescoped within the evaporator 26 in metal to metal, good heat-conducting relation. The upper end of the mix container protrudes above the annular shell cover and is closed by removable cover 70 having a journal opening 72 in its center which passes the upper end of the dasher axle. The lower end of the dasher axle seats in a journal recess 74 formed in the center of the bottom wall 76 of the mix container.

The dasher 78 comprises upper and lower bars 80, 82 welded, or otherwise secured in parallel relation, across the axle 66 and a series of shorter strips 84 having opposite sides inclined oppositely and propeller—like. To the ends of the upper and lower bars are secured vertical scrapper bars 86 having teeth 88 which engage the cylindrical wall of the mix container 68 to scrape the frozen product off the wall as the mix is rotated by the dasher.

Figure 5:
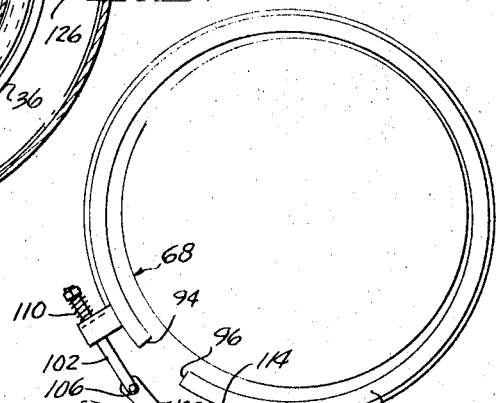
FIGURE 5 is a fragmentary view similar to FIGURE 3, omitting the housing shell and showing the toggle clamp in its open condition.
Figure 4:
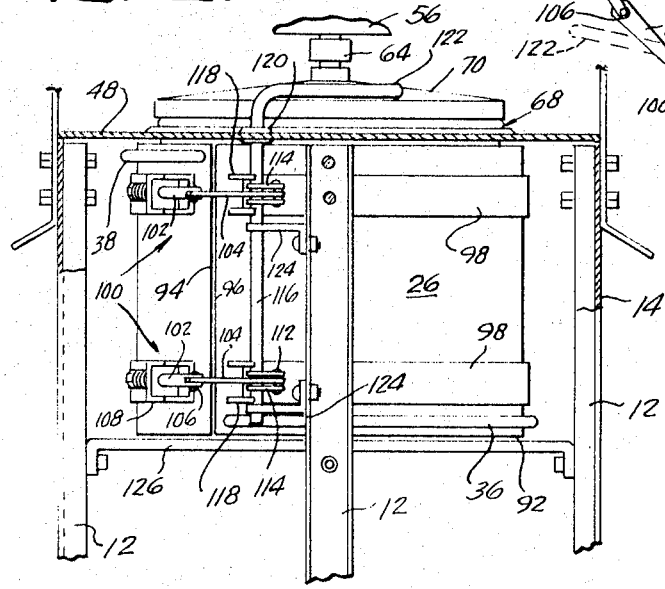
FIGURE 4 is a sectional view taken from line 4—4 of FIGURE 3, looking in the direction of the arrows.

FIGURES 3–5 illustrate the complementary, heat conducting structural relation between the mix container 68 and the evaporator 26, provided to enable the most rapid freezing in the shortest period of time by the elimination of air space, or pockets, between the two. The evaporator 26 of these figures is a double-walled, tubular body in which the space between the walls is provided for passage of the refrigerant, the double walls being closed at their tops and bottoms by short walls 90, 92, respectively, to prevent the escape of refrigerant except through the ducts provided therefor. Since a hollow-walled cylindrical body of the type of evaporator 26 will tend to straighten like a fire hose under pressure due to expansion and increased internal pressure when refrigerant passing therethrough conductively absorbs heat from the mix container wall with which it is in metal to metal contact, the evaporator is split vertically along a line parallel to its axis leaving a pair of edges 94, 96 on each side of the split which are also in the form of closing walls for the hollow evaporator. Upper and lower split reinforcing bands 98 are welded, or otherwise secured, to the outer wall of the evaporator to extned at least partially therearound and prevent spreading apart of the split walls 94, 96 during freezing of the mix, and a toggle clamp, to be described, serves to clamp the aforesaid split edges, or walls, together so that the evaporator tightly engages the inner wall of the evaporator in metal to metal contact with the outer mix container during freezing of the mix. Since during such freezing, water vapor in the atmosphere surrounding the evaporator and mix container will condense on these bodies and freeze also, it would then be very difficult to remove the mix container from the evaporator, for dispensing of the frozen contents, or for cleaning purposes. The toggle clamp, to be described, is designed to spread the split edges of the evaporator apart, thereby permitting easy removal of the mix container merely by lifting its upper edge which protrudes above the annular shell cover 48.

The toggle clamp is generally indicated by numeral 100 and comprises a pair of toggle links associated with each of the upper and lower reinforcing bands 98. The links 102, 104 of each pair are pivoted together at their ends, as indicated at 106, one of the links 102 being bifurcated to receive the other and the pivot bolt passing through the bifurcations. Link 102, which may have the shape of a bolt, passes through an aperture in a bracket 108 secured by welding, or other means, to the outer reinforcing band 98 of the evaporator near split edge 94. The free end of link 102 is connected to split edge 94 by a coil spring 110 housed between a nut and bracket 108, the spring biasing the bracket and split edge 94 toward the adjacent split edge 96 of the evaporator. The second link 104 of each pair has a curved free end which is pivoted by a pin 112 to the outer ends of a pair of crank arms 114 whose inner ends are welded, or otherwise secured, to a vertical rod, or shaft 116 which is journaled in notches in bracket members 118 which are secured to an end of the reinforcing strip 98 near the second split edge 96 of the evaporator. Preferably, the two crank arms 114 receive between them the free end of the second link 104. The upper end of the shaft 116 passes through a journal opening 120 in the annular cover of the shell and is bent to form a handle 122 overlying said cover. The shaft 116 is also journaled in openings in a pair of vertically spaced, L-shaped brackets which are fastened to one of the shell legs 12 by nuts and bolts. The toggle clamp, as described, is duplicated in its entirety except for the manipulating shaft, at both the top and bottom of the evaporator 26. The evaporator is removably held in position coaxial with the opening in cover 48 by said brackets 124 and by crossed seating straps 126 bolted to the legs 12.

It will be apparent, from the above description, that when the handle 122 is in the position shown in FIGURES 3 and 4 the links 104 are turned and pulled counterclockwise against the tension of the coil spring 110 to draw the split walls 94, 96 together, locking the evaporator in this condition with its inner surface in metal to metal contact with the mix container. The locking is accomplished by the over-center positions of the curved ends of the links 104 with respect to the shaft 116. When, however, the handle is turned from its FIGURE 3 to its FIGURE 5 position, the links 104 are turned clockwise by the crank arms 114 past the center of shaft 116, so that the links 102, 104 are extended full length between the brackets 108, 118, thus spreading apart the walls 94, 96 and opening space between the mix container 68 and the evaporator 26 which will permit ready removal of the mix container. When the toggle clamp 100 is in the open condition of FIGURE 5, as opposed to the closed condition of FIGURE 3, the mix container with a new mixture to be frozen may be as readily inserted, whereupon the handle 122 can be manipulated to turn the shaft 116 and close the toggle clamp to again tightly embrace the container 68 within the evaporator without any air space therebetween.

The use of a toggle clamp, such as above described, to accomplish metal to metal contact of the evaporator and mix container and avoid air space therebetween is of great importance in concentrating the freezing capacity of the apparatus in a small volume space conforming in surface area to that of the periphery of the mix container. Such concentration enables the freezing of five to six quarts of ice cream mix in less than 30 minutes and less than 45 minutes for sherbet. It has been found that the presence of air space as little as 0.005 inch between the evaporator and the mix container greatly increases the time necessary to freeze the mixture. An air space, even as small as five-thousandths of an inch introduces an insulating layer of air which is comparable in practical effect to the reduction of heat conduction caused by five and six inch spaces. Thus, the use of an evaporator which embraces the mix container in metal to metal contact so as to conduct heat directly from the mix through the container and evaporator walls to the refrigerant inside the evaporator, without interposition of radiation or conduction space, enables an efficiency and saving of time in freezing comparable to that obtained with the older types of freezers which utilize ice and salt in direct contact with the mix container.

For larger volume mix containers, those greater than six quarts, an evaporator according to FIGURES 6–9 is preferred in order to better withstand the greater expansion forces tending to straighten the evaporator. Evaporator 26' is in all respects similar to evaporator 26 previously described, except as noted as follows. The double wall, cylindrical evaporator 26' is formed with a second longitudinal split and closing walls 94', 96' along a line diametrically opposed to the line of the first split and its walls 94, 96. Thus, the evaporator is separated into two similar, semicylindrical segments, or portions, which are then hinged together by the pivot rod 128. This pivot rod, or bolt, passes through apertures which are vertically aligned in two brackets 130 which are bolted to a freezer leg 12, see FIGURE 8. The upper and lower reinforcing strips 98' on the evaporator are preferably in the form of U-shaped channels whose legs face outwardly, there being aligned apertures at 132 in these channels for passing the hinge bolt 128. The reinforcing channels 98' on one segment of the evaporator is offset at 134 FIGURE 9, to rotatably receive the cooperating ends of the reinforcing channels on the other segment of the evaporator. The toggle clamp 100' is in all respects identical with that described for the FIGURE 3 embodiment except that an additional spring 136 is mounted around the link 102 to oppose the spring 110, each of these springs abutting against opposite sides of an end wall 138 on reinforcing channel 98'. The upper and lower pairs of toggle links 102, 104 are identical. The manipulating rod 116 is journaled in aligned notches 140 in the legs of the upper and lower reinforcing channel strips 98'. Operation of the toggle clamp 100' of the FIGURE 6 embodiment is identical with that of the FIGURE 3 embodiment. Counterclockwise movement of the handle 122 from its position shown in FIGURE 6, serves to close and lock the two semicylindrical segments of the evaporator together, as shown in FIGURE 7. Movement of the handle in the opposite direction, as indicated by the arrows in FIGURE 7, opens the clamp and separates the two evaporator segments, which turn on hinge 128 to their positions of FIGURE 6. The second spring 136 forces apart the evaporator segments which otherwise would not readily separate under iced condition.

When the larger evaporator 26' is used, each segment of the evaporator is preferably provided with a separate restrictive tube, corresponding to tube 34 of FIGURE 2, and a separate inlet port 36' and outlet port 38' so that the condensed refrigerant may flow uniformly to and through each segment.

Figure 10:
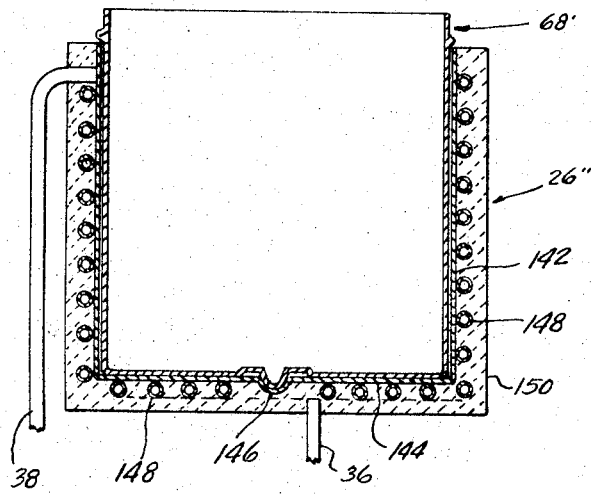
FIGURE 10 is a vertical sectional view of a modified evaporator which may be substituted for the evaporators illustrated in either FIGURE 3 or FIGURE 6.
Figure 11:
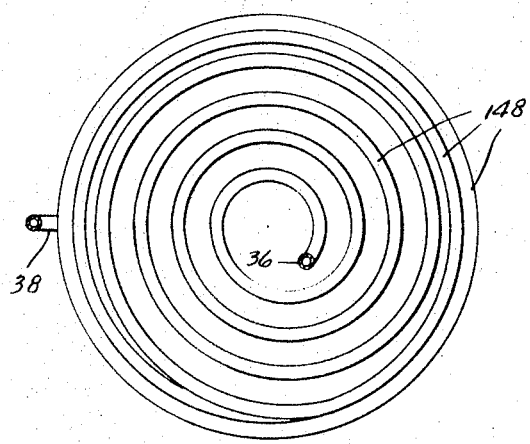
FIGURE 11 is a bottom plan view of the evaporator of FIGURE 10 with the insulation removed.

With a mix container 68', smaller than five quarts, it is preferred to utilize an evaporator 26'' of the type illustrated in FIGURES 10 and 11. This evaporator is unsplit and requires no toggle clamp, but comprises an inner tubular metal shell 142 closed at the bottom by a flat wall 144 having a central depression 146 to receive the protruding dasher axle socket of the mix container 68'. Surrounding the bottom and side walls of the evaporator in contact therewith is a continuous length of coiled tubing 148 formed at the bottom as an outward diverging spiral which continues up the side wall of the evaporator as a helical coil, the entry duct 36 being shown near the center of the bottom, and the outlet duct 38 for refrigerant vapor and liquid being shown at the top. If desired, the tubing 148 and ducts 36, 38 may be integrally formed from one length of tubing. Surrounding the coil 148 is a wall of insulating material 150, such as Styrofoam. The outer diameter of the mix container 68' and the inner diameter of the evaporator wall 142 are such as to enable a telescoping fit of the container into and out of the evaporator, there being direct metal to metal contact without air pockets or any substantial air space between said vessels including their bottoms, which are also in metal to metal heat conducting contact.

Figure 12:
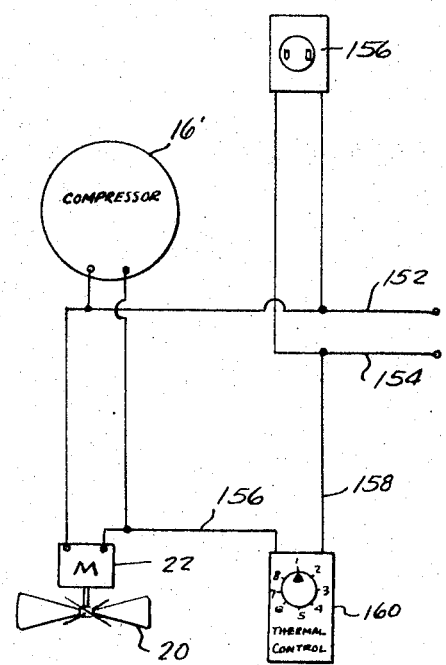
FIGURE 12 is a circuit diagram showing the electrical connections of the ice cream freezer.

FIGURE 12 illustrates the electrical connections which enable the freezer to be carried to any location and plugged in to a source of power for operation. The compressor motor 16' and the fan motor 22 are shown to be connected in parallel across the power leads 152, 154. A female outlet 156 has its terminals also connected across lines 152, 154. Inserted in circuit of motor 22 by lines 156, 158 is a thermal control 160 for a thermal sensor, not shown, which may be located against, or adjacent, a wall of the evaporator. FIGURE 1 shows a preferred location of the thermal control 160 adjacent an outlet panel 162 which covers the opening 164, FIGURE 2, in the shell 14. The power cord 152, 154 leads through said panel, and a second cable 166 may be plugged into the receptacle 156 to power the dasher motor 62.

It is believed that the manner of use and mode of operation of the above-described equipment will be selfevident. It will be apparent that the device provides an apparatus for quickly freezing ice creams, sherbets and ices, or for cooling liquids, in which the disadvantages of the conventional salt and ice freezers are overcome while at the same time the speed of freezing is retained in contrast with the inefficiency of other electrical freezers marketed for the same purpose which depend on cooling the product mix by convection currents and radiation, rather than by directly conducting heat away from the mix container. A separate mix can is provided to enable removal from the evaporator for frequent cleaning or sterilizing. These great advantages are obtained primarily by providing an evaporator which slidably embraces the mix container with a fit tight enough to exclude substantially all air space therebetween. In all sizes, the freezer operates rapidly to make ice cream in from about 25 to about 32 minutes and sherbets in about 45 minutes. Once the ice cream is frozen to a desired creamy consistency, it can be kept indefinitely by setting the thermostat control 160 so that the refrigerant apparatus will operate intermittently to keep the ice cream frozen at a selected temperature, the dasher motor being meantime unplugged and the dasher being removed from the frozen mix if desired. The toothed dasher enables the making of frozen ices, such teeth serving to scrape off and break up large crystals of ice formed first against the wall of the mix container, so that all parts of the mix are frozen to the same smooth consistency and with small ice crystals. The described freezer will chill liquids for drinking from about 70° F. to about 40° F. in approximately fifteen minutes.

The evaporators of FIGURES 3 and 6 may be surrounded by insulating material such as the Styrofoam of FIGURE 10.

Although certain specific embodiments have been shown and described, it is obvious that many modifications thereof are possible. The invention, therefore, is not to be restricted except insofar as is necessitated by the prior art and by the spirit of the appended claims.

What is claimed is:

1. For use in a portable freezer for ice cream, sherbets and ices, the combination of a container for holding a mix to be frozen with an evaporator telescopically embracing the container for cooling the latter, said container having walls formed of heat conducting material, said evaporator comprising a receptacle having a heat conducting wall conforming in shape to at least one wall of said container and contacting the latter in direct heat conducting relation, means adjacent said receptacle wall for passage of a fluid refrigerant through the evaporator, and means permitting separation of said container from the embracing evaporator receptacle to permit emptying and cleaning of the container, said evaporator being a double-walled cylindrical receptacle, and the double wall defining a hollow space for entrance, passage and exit of a refrigerant fluid, said cylindrical evaporator receptacle being split longitudinally, said means permitting separation of said container and embracing evaporator receptacle comprising a toggle clamp connected to the adjacent edges of the evaporator receptacle along said split, the toggle clamp when in its closed position drawing the edges of said receptacle along said split together to tightly embrace the evaporator receptacle about said mix container and when in open condition separating the split edges of the evaporator receptacle to permit withdrawal of the mix container, said toggle clamp comprising a pair of links pivoted together at adjacent ends, one of said links having its free end connected to one of said split edges of the evaporator receptacle, the other of said links being pivotally connected to the outer end of a crank arm whose inner end is connected to a manipulator rod, said rod being journaled in a part fixed to the other split edge of the evaporator receptacle, whereby turning of said manipulator rod serves to swing said pair of links in toggle fashion between said open and closed positions.

2. The combination according to claim 1, wherein said free end of said one link is secured to one edge of the evaporator receptacle by a spring which biases said one receptacle edge toward the other split edge of the receptacle.

3. The combination according to claim 1, wherein said evaporator receptacle is provided with at least one external reinforcing band.

4. The combination according to claim 1, wherein said mix container and evaporator receptacle are housed in a shell at the upper portion thereof, the lower portion of said shell housing refrigerant apparatus including a compressor, a heat exchanger, a condenser and a fan, and duct means for refrigerant fluid leading from said compressor to said condenser, through a restricted conduit to said evaporator receptacle and from said evaporator receptacle through said heat exchanger back to said compressor.

5. The combination according to claim 4, wherein said shell has a cover, an aperture in said cover through which passes said manipulator rod for the toggle clamp, and a handle on said manipulator rod for turning the same.

6. The combination according to claim 4, wherein said duct means includes a manifold, a pair of entry conduits connecting said manifold to the lower parts of said split evaporator receptacle, and a pair of outlet conduits leading from the upper parts of said split evaporator receptacle to said heat exchanger.

7. For use in a portable freezer for ice cream, sherbets and ices, the combination of a container for holding a mix to be frozen with an evaporator telescopically embracing the container for cooling the latter, said container having walls formed of heat conducting material, said evaporator comprising a receptacle having a heat conducting wall conforming in shape to at least one wall of said container and contacting the latter in direct heat conducting relation, means adjacent said receptacle wall for passage of a fluid refrigerant through the evaporator, and means permitting separation of said container from the embracing evaporator receptacle to permit emptying and cleaning of the container, said evaporator being a double-walled cylindrical receptacle, the double wall defining a hollow space for entrance, passage and exit of a refrigerant fluid, said cylindrical evaporator receptacle being split along two diametrically opposed lines lengthwise thereof to form two sections, hinge means connecting said sections along one of said lines of said split, said means permitting separation of said container and evaporator receptacle comprising a clamp connecting the edges of the evaporator receptacle along the other of said lines of said split, said clamp when in its closed condition locking the evaporator receptacle in tight embracing engagement around the mix container and when in its open condition spreading said split edges of the evaporator receptacle to permit separation of the mix container from the evaporator receptacle.

8. The combination according to claim 7, wherein said clamp comprises a first and second link pivoted together at adjacent ends, the free end of the first link being connected to one split edge of the evaporator receptacle by a pair of springs biasing the said one edge in opposite directions, the free end of the second link being pivotally connected to a crank arm on a manipulator rod journaled in a part fixed to the other split edge of the receptacle, one of said springs serving to maintain the toggle in closed and locked condition and the second spring tending to open the toggle when the second link passes center so as to force the split edges of the evaporator receptacle apart.

9. The combination according to claim 7, wherein said mix container and evaporator receptacle are housed in a shell at the upper portion thereof, the lower portion of said shell housing refrigerant apparatus including a compressor, a heat exchanger, a condenser and a fan, and duct means for refrigerant fluid leading from said compressor to said condenser, through a restricted conduit to said evaporator receptacle and from said evaporator receptacle through said heat exchanger back to said compressor.

10. The combination according to claim 9, in which said shell is perforated in vertically spaced portions whereby to admit a flow of air through the lower portions of the shell and about said refrigerant apparatus.

11. The combination according to claim 10, wherein there is additionally provided a rotatable dasher in said mix container having an axle passing through a cover therefor, and a motor mounted on a support bar releasably supported above the mix container, said motor having a dependent drive shaft with a separable coupling engaging the outer end of the dasher axle for rotating the same.

12. The combination according to claim 11, wherein said mix container is cylindrical, said dasher comprising a pair of blades parallel to said axle and having teeth in scraping engagement with the cylindrical wall of said container.

13. The combination according to claim 7, wherein said clamp comprises two pairs of links, each pair pivoted together at adjacent ends, one of said links of each pair having its free end connected to one of said split edges of the evaporator receptacle, the other of said links of each pair being pivotally connected to the outer end of a crank arm, both said crank arms being connected to a single manipulator rod journaled in parts secured in the other split edge of the evaporator receptacle, whereby turning of said manipulator rod serves to swing both said pairs of links in toggle fashion between said open and closed positions.

14. The combination according to claim 7, wherein said clamp comprises a pair of links pivoted together at adjacent ends, one of said links having its free end secured to one split edge of the evaporator receptacle by a spring which biases said one edge toward the other split edge of the receptacle, the other of said links being pivotally connected to the outer end of a crank arm whose inner end is connected to a manipulator rod, said rod being journaled in a part fixed to said other split edge of the evaporator receptacle, whereby turning of said manipulator rod serves to swing said pair of links in toggle fashion between said open and closed conditions.

15. The combination according to claim 7, wherein said evaporator receptacle is provided with at least one external reinforcing band.

References Cited

UNITED STATES PATENTS

| 1,950,781 | 3/1934  | Burns    | 62—342    |
| 2,622,851 | 12/1952 | Minor    | 165—46 X  |
| 2,657,554 | 11/1953 | Hull.    |           |
| 2,731,809 | 1/1956  | Hackney  | 62—342    |
| 2,849,868 | 9/1958  | Anderson | 62—342    |
| 3,004,398 | 10/1961 | Mullins  | 62—342 X  |
| 3,335,789 | 8/1967  | Raskin   | 165—80    |

WILLIAM E. WAYNE, *Primary Examiner.*

U.S. Cl. X.R.

62—342, 448; 165—46